United States Patent [19]

Frederick

[11] Patent Number: 4,945,764
[45] Date of Patent: Aug. 7, 1990

[54] CONSTANT GAIN LAMINAR JET ANGULAR RATE SENSING DEVICE

[76] Inventor: Gary L. Frederick, 1733 Brandon Close, Rockford, Ill. 61107

[21] Appl. No.: 281,680

[22] Filed: Dec. 9, 1988

[51] Int. Cl.$^5$ .............................................. G01P 9/00
[52] U.S. Cl. ...................................... 73/497; 73/515; 137/804
[58] Field of Search .................. 73/505, 515, 516 LM, 73/497; 137/804, 814, 835

[56] References Cited

U.S. PATENT DOCUMENTS

| | | | |
|---|---|---|---|
| 3,635,095 | 1/1972 | Schuemann | 73/505 |
| 4,276,895 | 7/1981 | Drzewiecki | 137/835 |
| 4,305,293 | 12/1981 | Swarts | 73/505 |
| 4,467,984 | 8/1984 | Tippetts | 244/78 |

*Primary Examiner*—John Chapman
*Attorney, Agent, or Firm*—Leydig, Voit & Mayer

[57] ABSTRACT

A laminar jet angular rate sensor senses inertial angular rate in flight control and stabilization systems for aircraft and other vehicles. The sensor utilizes fluid as a power source and may be interfaced directly with fluid powered actuators for closed loop rate stabilization of the vehicle. To be practical, the rate sensor must exhibit consistent operation over the side range of supply fluid temperatures seen in a typical application. This invention involves apparatus for providing constant sensor gain over a wide range of fluid viscosity conditions. To achieve this, the pressure drop across the rate sensor is varied proportional to supply fluid viscosity to overcome viscous momentum losses in the jet and provide a constant gain characteristic. The specific apparatus of the invention utilizes a pressure regulator with a fluid viscosity sensor to accurately provide the required supply pressure proportional to fluid viscosity schedule.

13 Claims, 10 Drawing Sheets

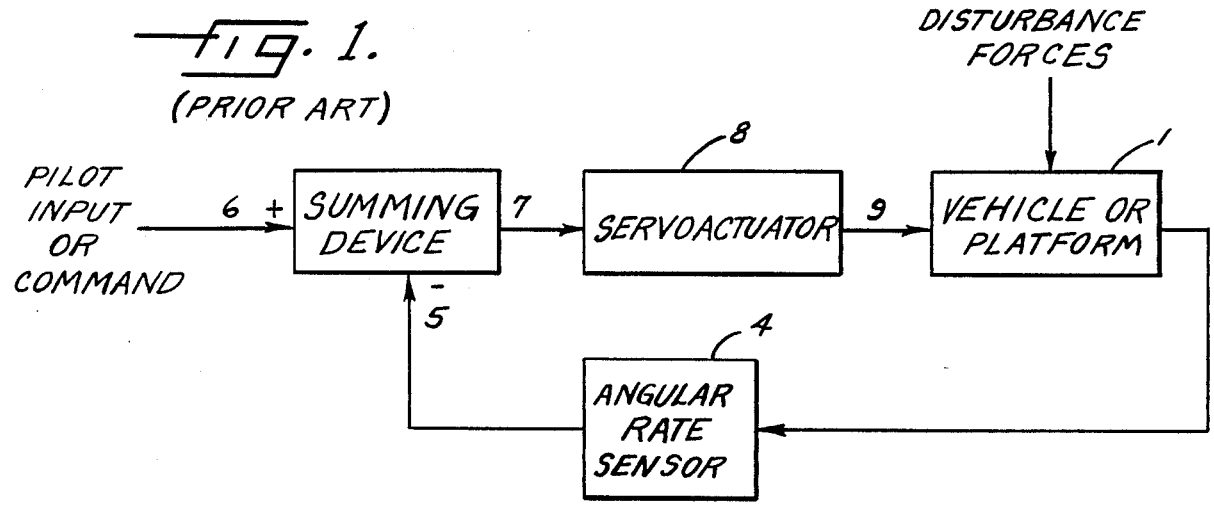
Fig. 1. (PRIOR ART)
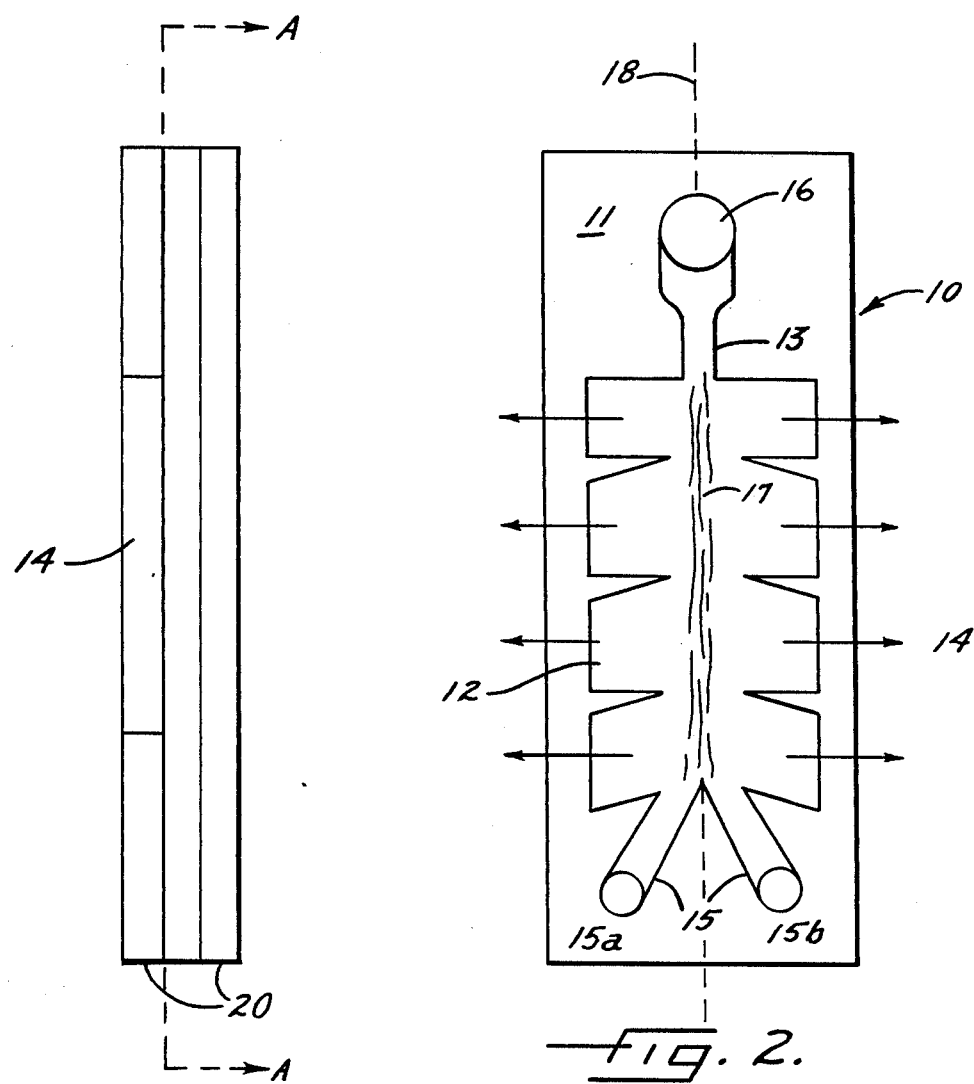
Fig. 2A. (PRIOR ART)
Fig. 2. (PRIOR ART)

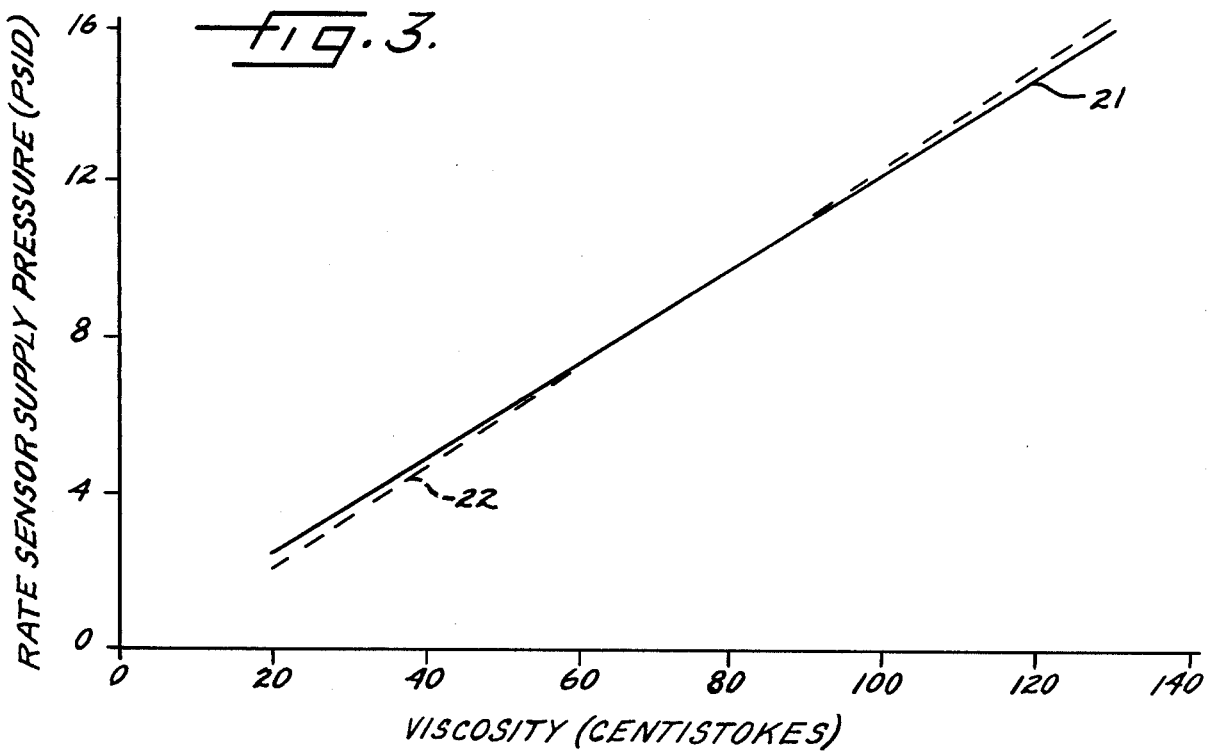
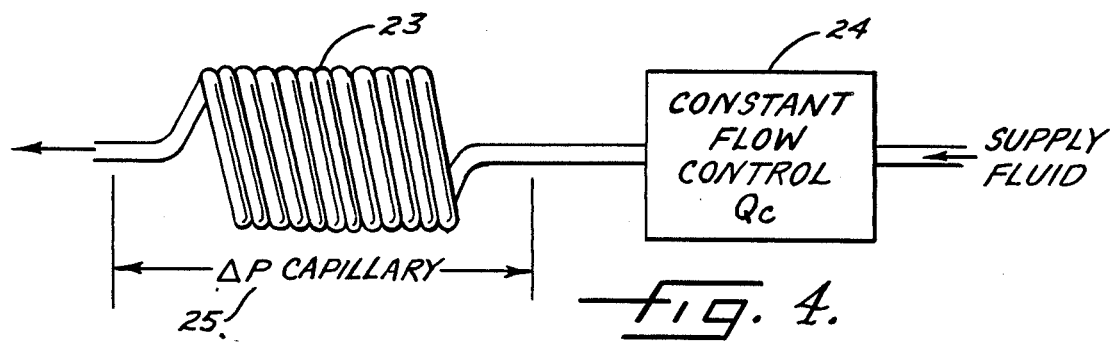
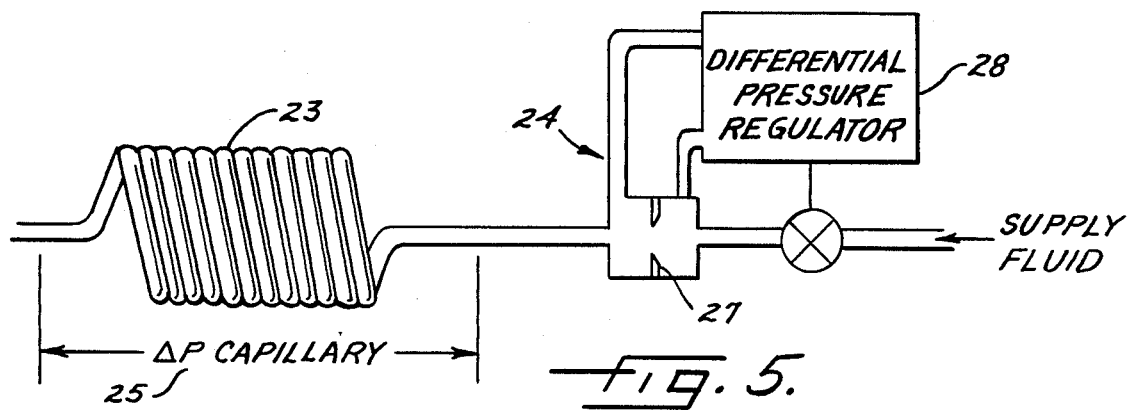

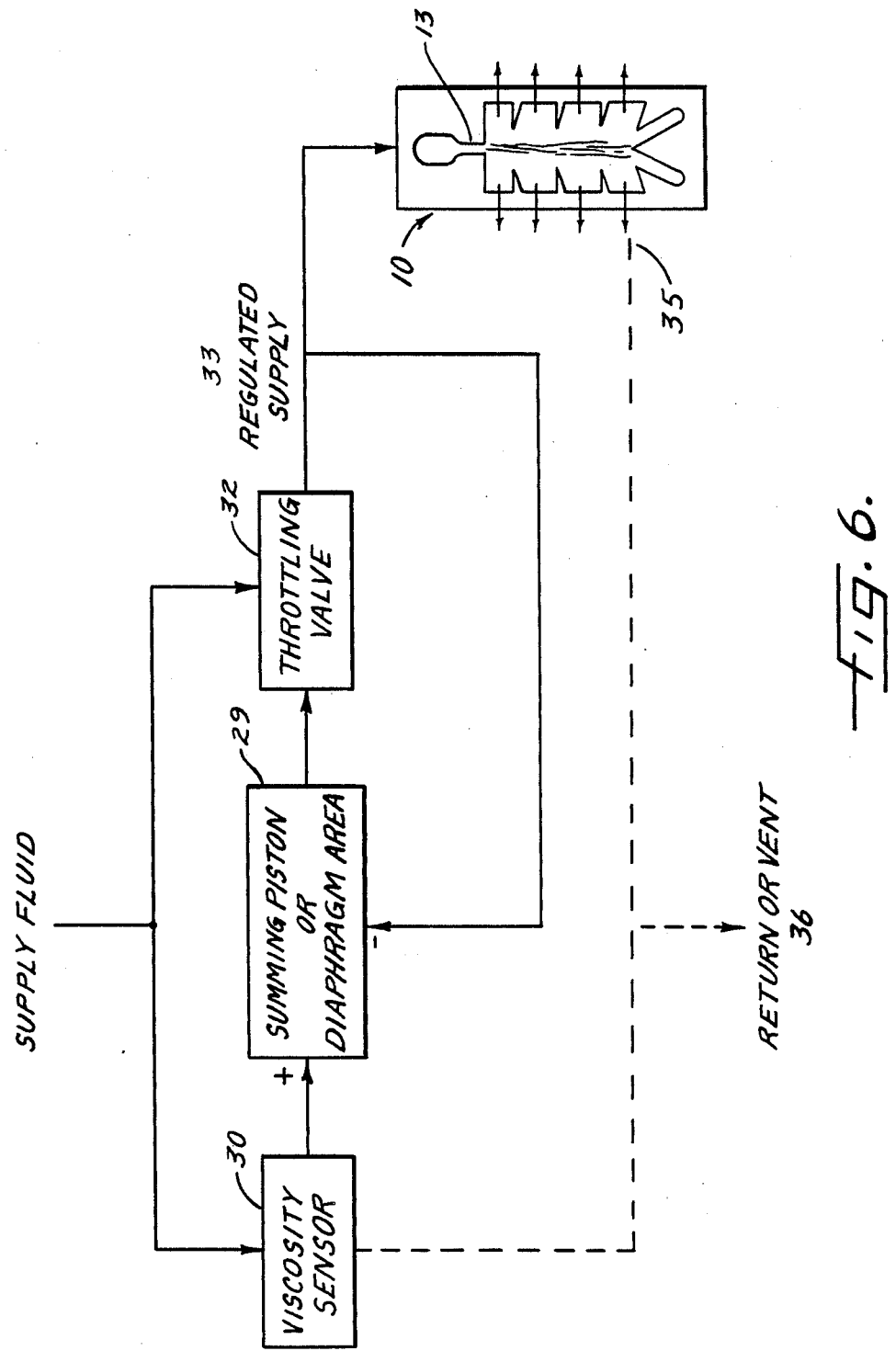

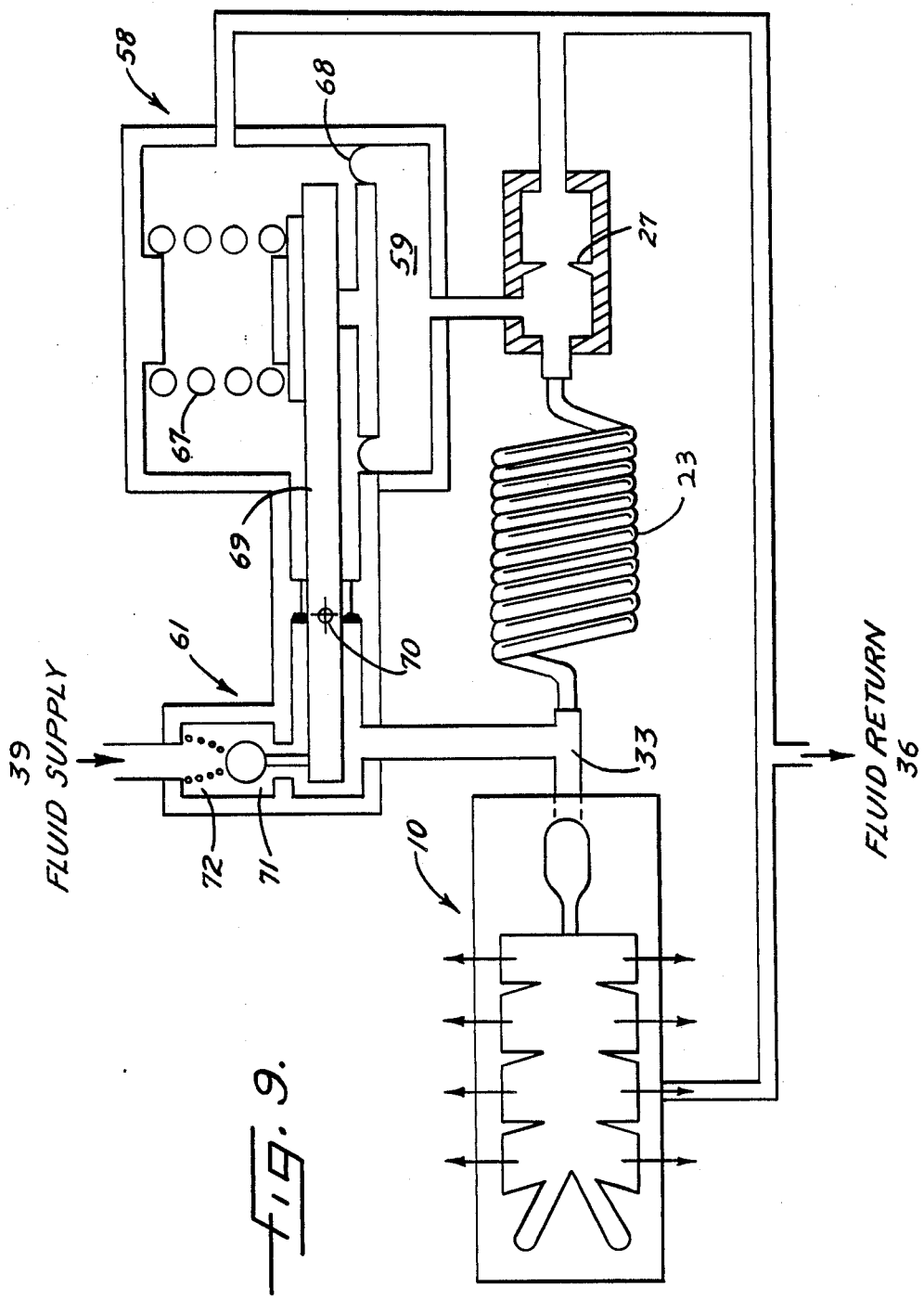

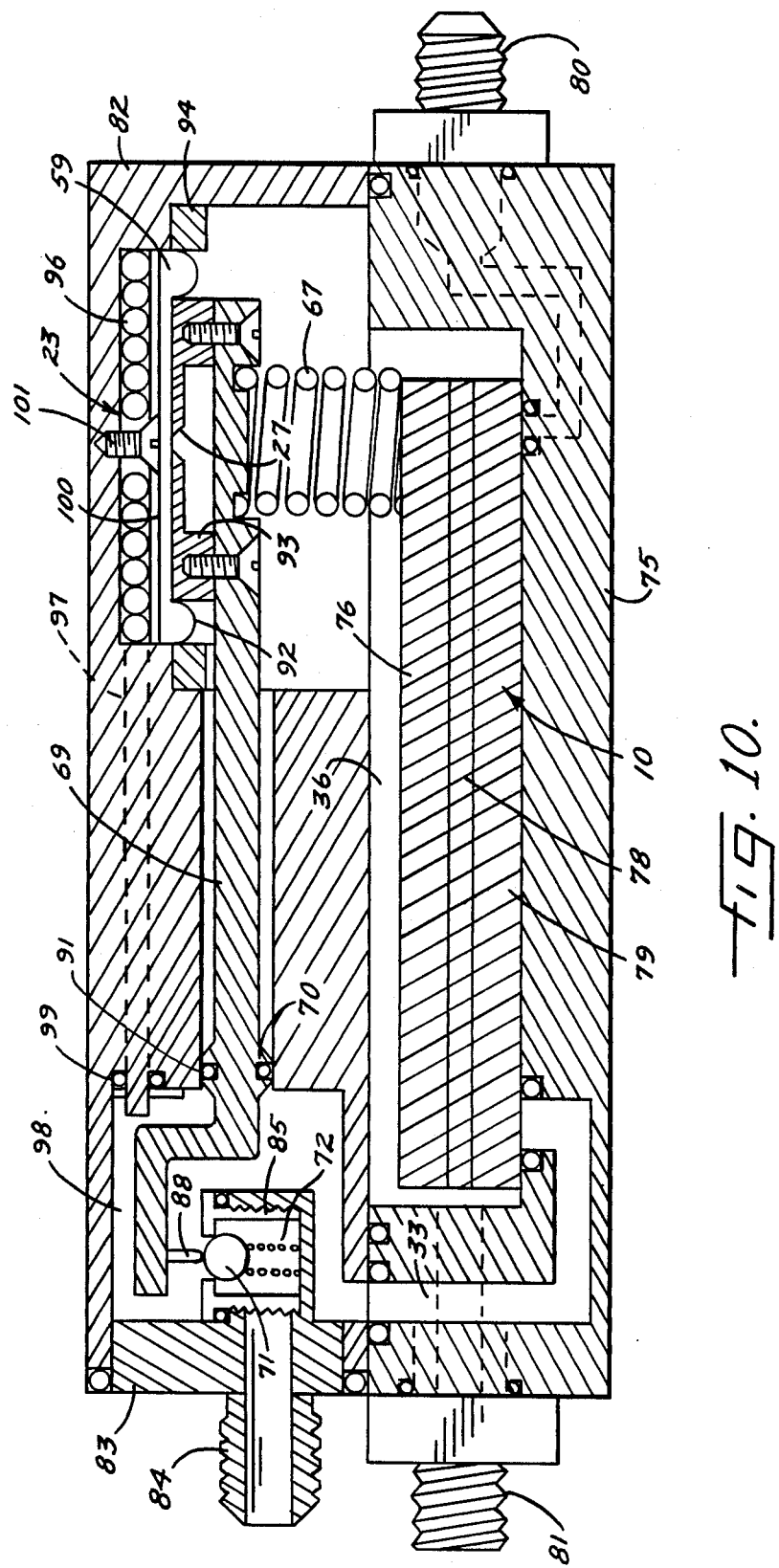

CONSTANT GAIN LAMINAR JET ANGULAR RATE SENSING DEVICE

BACKGROUND OF THE INVENTION

This invention relates to inertial angular rate sensing devices and systems. More specifically, the invention relates to rate sensing systems utilizing fluid as a power source.

Many vehicles or platforms (e.g., vehicle gun platforms, radar antennas, aircraft flight control systems) utilize rate sensing devices in closed loop control systems to stabilize their orientation in inertial space as they are exposed to external disturbances such as wind gusts or terrain changes. In addition, many aircraft and missiles are aerodynamically unstable, requiring rate feedback using rate sensors to make them stable or flyable by a human pilot.

There are a variety of gyroscopes which utilize optics or spinning or vibratory masses to sense angular rate. The resulting signal is converted to an appropriate electrical signal, processed by an electronic controller, and transduced to a mechanical force or position to move a valve in the hydraulic actuators driving the vehicle's control surfaces. Although these electronics-dependent rate control techniques ar highly developed and have many applications, there are many drawbacks:

(1) Expense in converting the rate signal from one medium to another (i.e., mechanical to electronic to mechanical to fluid).

(2) Lack of reliability. Aircraft flight controls typically require more than one channel of redundancy to provide the required degree of safety.

(3) Dependency on electrical power.

(4) Lack of ruggedness of gyroscope technologies makes them susceptible to damage from gun shock, handling, and other extreme environments.

(5) Low level electronic signals are susceptible to electromagnetic interference.

(6) Electronic devices are subject to permanent damage by lightning strike or energy beam weapons no under development.

This creates the need for a primary or back up angular rate sensing system that does not require electrical power or electronic signal processing—ideally a sensing and control system which utilizes the actuation fluid supply as the sensor power source also There has been a great deal of previous development work on inertial angular rate sensors which utilize fluid as a power source. Most work has centered on the vortex angular rate sensor and the laminar jet angular rate sensor. The vortex angular rate sensor detects the change in angular momentum in fluid spinning in a vortex chamber as the chamber is rotated in inertial space. The laminar jet angular rate sensor consists of a nozzle, a laminar jet issuing from the nozzle, and a pair of ports located symmetrically about the jet center line. The laminar jet angular rate sensor concept is considered to be superior to the vortex type in linearity, signal-to-noise ratio, fluid power consumption, ease of manufacture, and compatibility with fluidic amplifier techniques. The primary drawback in prior art angular rate sensors is the variation in critical performance factors such as gain and zero, or null offset, as supply fluid viscosity changes with temperature. This is especially a problem with hydraulic fluid, which can exhibit a 2 to 1 viscosity change with only 10° to 20° F. temperature change.

To obtain acceptable signal-to-noise ratio from the sensor, it is operated in the fully laminar flow regime. Previous testing shows the sensor to be laminar for a Reynold's number ($R_e$) less than 1200

$$\left( R_e = \frac{\rho V d}{\mu} < 1200 \right) \text{ where}$$

$\rho$ is the supply fluid density
$\mu$ the supply fluid viscosity
V is the jet spouting velocity and
d is the jet depth.

The sensor gain is highest when operated at the maximum Reynold's number which still provides laminar flow. Previous attempts at applying the laminar jet angular rate sensor have either utilized a fixed supply pressure or have varied supply pressure to keep the jet Reynold's number in a constant 900 to 1100 range. The Reynold's number control technique keeps jet spouting velocity proportional to viscosity. For a short nozzle, this requires a differential pressure across the nozzle nearly proportional to the square of viscosity changes. This can greatly reduce null offset and prevent transition to turbulence, but the resulting large pressure changes still allow large viscosity related variations in gain, the most important sensor characteristic in a vehicle rate stabilization system.

SUMMARY OF THE INVENTION

The object of the present invention is to provide a laminar jet rate sensing system which exhibits a constant gain characteristic (differential output pressure versus angular rate) over a wide range of supply fluid viscosities and operating temperatures.

A further object is to provide an apparatus which automatically modulates the supply fluid to the laminar jet nozzle to provide a constant operating gain without need for external signals or adjustments to the sensor as fluid properties change.

My testing and analysis of a laminar jet angular rate sensor reveal that a constant output gain characteristic will be obtained by providing a differential pressure which is proportional to fluid viscosity across the rate sensor supply nozzle. This invention provides apparatus for automatically sensing fluid viscosity and varying the supply to the nozzle to provide a differential pressure proportional to viscosity. The apparatus includes a fluid viscosity sensor which works in conjunction with a sensitive fluid regulating mechanism to inherently provide the required supply pressure schedule. In one preferred embodiment, the rate sensor supply pressure is sensed by a viscosity sensitive capillary restrictor in series with a non-viscosity sensitive sharp-edged orifice. The regulating mechanism controls the pressure drop across the orifice, or flow through the capillary and orifice, to a constant value. The result is a pressure drop across the capillary which is exactly proportional to fluid viscosity. By design, the capillary and orifice are sized so that the constant pressure drop across the orifice is small compared to the pressure drop across the capillary. The result is a regulated supply pressure across the rate sensor nozzle which very accurately satisfies the ideal pressure versus viscosity requirement.

BRIEF DESCRIPTION OF THE DRAWINGS

FIG. 1 is a block diagram for a single axis of a typical prior art vehicle stabilization system.

FIG. 2 is a cross-sectional view of a typical prior art laminar jet angular rate sensor in the plane of angular rate being sensed, the view being taken along the line A—A of FIG. 2A.

FIG. 2A is a side elevational view of the angular rate sensor shown in FIG. 2.

FIG. 3 is a graph of supply pressure to a hydraulic fluid powered laminar jet rate sensor versus hydraulic fluid viscosity to maintain a constant rate sensor gain characteristic.

FIG. 4 is a schematic view of a fluid viscosity sensor utilizing a capillary tube and a constant flow source.

FIG. 5 is a schematic view of a fluid viscosity sensor utilizing a capillary tube in series with a sharp edged orifice and a differential pressure regulator to maintain a constant differential pressure across the orifice and constant flow through the orifice and capillary.

FIG. 6 is a block diagram of one embodiment of a rate sensor and supply system which utilizes a viscosity sensor with an output pressure proportional to fluid viscosity as a reference or pilot pressure to a pressure regulating valve to provide a rate sensor supply pressure proportional to viscosity.

FIG. 9 is a schematic view of the preferred laminar jet rate sensor and fluid supply system which is shown by the block diagram of FIG. 8 and which consists of a throttling valve, a diaphragm sealed sensing piston, a pivoted beam for modulating the throttling valve as a function of differential pressure across the piston and the reference spring setting, and a capillary and sharp-edged orifice for providing a feedback pressure to the piston which is proportional to throttling valve output pressure and inversely proportional to fluid viscosity.

FIG. 10 is a cross-sectional view of a preferred structural embodiment of a rate sensor of the type which is shown schematically in FIG. 8 and FIG. 9.

DETAILED DESCRIPTION

Introduction

Figure 7:
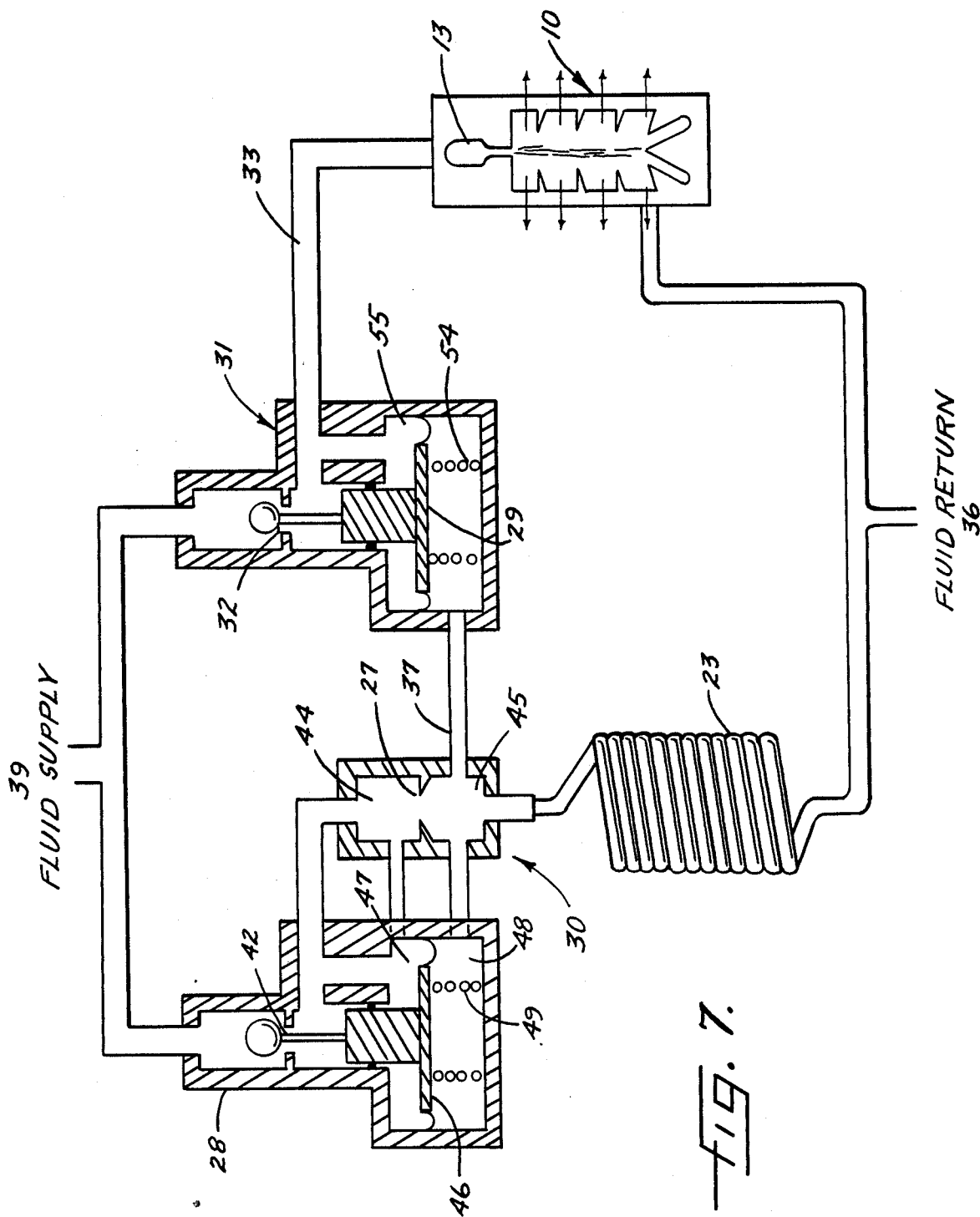
FIG. 7 is a schematic view of the rate sensor and rate sensor supply system which is shown by the block diagram of FIG. 6 and which consists of a capillary and sharp-edged orifice, a differential pressure regulator to maintain constant flow through the capillary and orifice, a reference pressure regulator which responds to changes in the viscosity sensor output pressure to provide a supply pressure to the rate sensor proportional to fluid viscosity.

FIG. 1 is a block diagram of a typical prior art single axis stabilization system. It is usually desired to control or maintain a vehicle or platform (1) such that its attitude in inertial space is fixed and stable under the presence of external disturbance forces such as wind gusts or terrain variations. To provide the desired attitude stabilization, the vehicle's inertial angular rate is sensed by one or more angular rate sensors (4). The output (5) of the rate sensor is compared to a fixed reference or command signal (6) and the difference (7) is amplified and provides an input signal to a servoactuating system (8) to provide aerodynamic or mechanical attitude correcting forces (9). In most aircraft stabilization systems, the servoactuator is hydraulically powered and the rate sensors and summing devices are electrically powered. To simplify the stabilization system, increase reliability, and reduce cost, it is often desirable to utilize hydraulic or fluid power as the power source for the angular rate sensors and summing devices as well.

FIG. 2 is a cross-sectional view and FIG. 2A is an elevational view of a typical prior art laminar jet angular rate sensor (10) which utilizes fluid as its power source. It includes a housing (11) and an internal chamber (12). The internal chamber consists of a supply flow nozzle (13), an exhaust flow chamber (14), and two output signal ports (15). The nozzle is connected to a source of fluid (16) at a pressure sufficient to form a laminar jet (17) at the exit of the nozzle (13). The momentum from the jet is recovered by the output signal ports (15) which are placed symmetrically about the center line (18) of the jet. When the sensor is fixed in inertial space (zero angular rate or rotational velocity), the pressure recovered in the output signal ports (15) are equal. When the sensor experiences an angular rate in the plane of the jet, the coriolis acceleration forces on the jet cause it to bend, no longer traversing on the nozzle center line (18). The result is a greater pressure recovered in output port (15a) than in output port (15b). The amount of jet deflection and resulting output port pressure differential are a function of both jet fluid velocity and angular rate. A properly designed laminar jet angular rate sensor will provide a linear, low noise, differential output signal proportional to angular rate over a wide range of angular rates. However, the performance of these devices is extremely sensitive to changes in fluid properties and the resulting effect on the jet velocity profile.

Even though the principle of utilizing jet deflection to sense angular rates has been known for many years, the variation in performance with fluid property changes and operating temperature has greatly restricted its practical application, especially with hydraulic fluid which exhibits large variations in viscosity as temperature varies. As shown in FIG. 2A, the jet (17) is bounded top and bottom by plates (20) which prevent its deflection in directions other than the plane in which it is desired to sense angular velocity. These plates plus the stagnant fluid bounding the jet create viscous losses which decrease jet velocity and increase jet spreading as viscosity increases. The result is decreasing rate sensor gain with increasing viscosity. Implementation of a practical stabilization system requires nearly constant gain over a wide range of fluid temperature and viscosity.

Analysis of the viscous losses shows that increasing supply pressure differential across the nozzle (13) proportional to fluid viscosity will maintain jet momentum at the output ports (15) which will provide a constant output pressure difference versus angular rate gain characteristic as the jet bends due to angular rate influences. This has been verified by testing on several rate sensor configurations. The solid line (21) in FIG. 3 presents a curve of nozzle (13) pressure differential versus supply fluid viscosity required to provide a constant rate sensor gain of 0.002 psid/deg/sec. This curve was generated from test data on a rate sensor with a 0.100×0.100 inch nozzle and hydraulic fluid viscosities from 20 to 130 centistokes.

DESCRIPTION OF EMBODIMENTS

Figure 8:
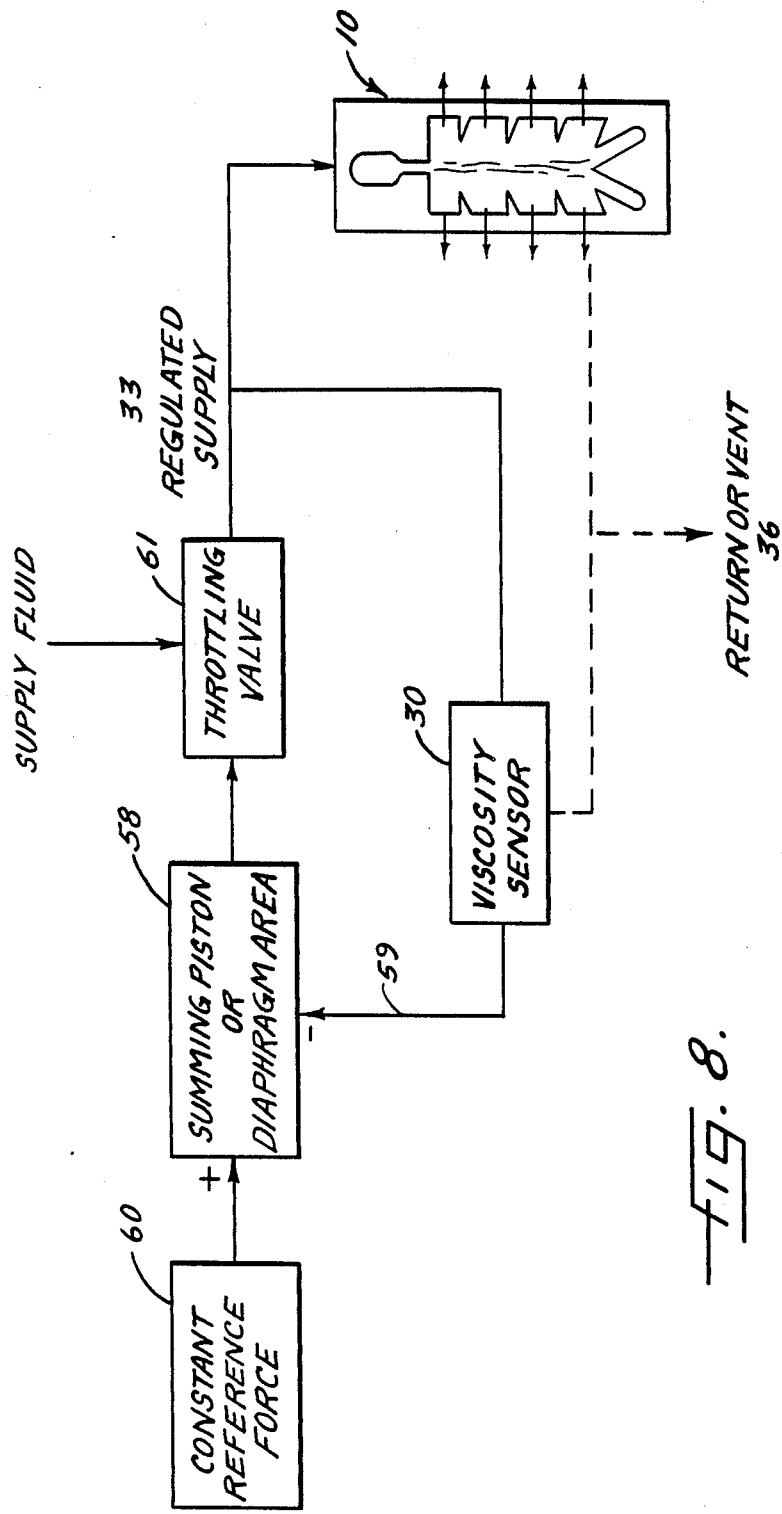
FIG. 8 is a block diagram of a preferred rate sensor and supply system which utilizes a viscosity sensor to provide feedback pressure proportional to rate sensor supply pressure and inversely proportional to viscosity.

FIGS. 4 and 5 show apparatus for non-electronically sensing fluid viscosity changes. FIGS. 6 and 7 show an embodiment for exactly reproducing the desired supply schedule (21) using the viscosity sensors of 4 and 5 as a reference to a pilot-operated pressure regulator. FIGS. 8, 9, and 10 show a preferred embodiment, which utilizes a capillary and a sharp-edged orifice in the feedback path of a specially-designed pressure regulator to nearly exactly reproduce the ideal supply pressure schedule. Testing of the embodiment of FIGS. 8, 9, and 10 has resulted in a regulated pressure versus viscosity schedule as shown by the dashed line (22) of FIG. 3. As will become more apparent later, this embodiment has the advantage of requiring only one throttling valve, or regulating mechanism, providing a more compact, more reliable and reduced cost design with only one moving-part assembly.

FIG. 4 is a schematic view of a non-electronic viscosity sensor which may be utilized as one of the elements for providing the required schedule of nozzle pressure versus viscosity. It consists of a capillary fluid restrictor (23) and a flow control device (24) for maintaining a constant volumetric flow rate through the capillary. For a round capillary tube, the pressure drop (25) across the capillary is described by the equation:

$$\Delta P_{capillary}(25) = \frac{128 \, \mu L \, Q}{\pi D^4}$$

where
 $\mu$ = fluid viscosity (lb-sec/in$^2$)
 L = capillary length (in)
 D = capillary diameter (in) and
 Q = volumetric flow rate (in$^3$/sec)

If volumetric flow through the capillary (23) is held constant by the flow control device (24), then the $\Delta P$ (25) across the capillary is proportional to fluid viscosity $\mu$, or $\Delta P_{capillary}$ (25) = $K_1 \mu$.

This $\Delta P$ capillary signal (25) can then be utilized with a pilot pressure regulator or similar flow throttling mechanism to provide the required linear schedule of supply pressure versus viscosity.

FIG. 5 is a schematic view of the non-electronic viscosity sensor of FIG. 4 in which the flow control (24) to provide the constant flow across the capillary (23) is implemented by a combination of a sharp-edged orifice (27) and differential pressure regulator (28).

The equation for flow $Q_{orifice}$ through a sharp-edged orifice in terms of in$^3$/sec is:

$$Q_{orifice} = C_D A_0 \sqrt{\frac{2g \, \Delta P_{orifice}}{\rho}} \quad \text{where}$$

A$_0$ is the geometric area of the orifice (in$^2$)
$\Delta P_{orifice}$ is the difference between the pressures upstream and downstream of the orifice (psid)
g is the gravitational constant (386 in/sec$^2$)
$\rho$ is the fluid density (lb/in$^3$) and
C$_D$ is the discharge coefficient (dimensionless)

For orifice Reynold's numbers above 100, a properly designed sharp-edged orifice has a constant discharge coefficient nearly equal to 0.6. If the differential pressure regulator (28) regulates $\Delta P_{orifice}$ to a constant value and fluid density is constant, then:

$$Q_{orifice} = Q_{capillary} = C_D A_0 \sqrt{\frac{2g \, \Delta P_{orifice}}{\rho}} = K_2,$$

providing constant flow through the capillary (26) and orifice (27) regardless of supply pressure increases and viscosity changes. The result is again a capillary pressure drop (25) which increases directly proportional to viscosity ($\Delta P_{capillary} = K_1 \mu$).

FIG. 6 is a block diagram showing how a viscosity sensor (30) of the type shown in FIGS. 4 and 5 may be utilized with a pilot pressure regulator consisting of a differential sensing piston (29) which actuates a throttling valve (32) to provide a regulated supply (33) to the rate sensor supply nozzle (13). Both the viscosity sensor (30) and the rate sensor exhaust (35) are referenced to the same flow return line (36). The output pressure of the viscosity sensor (30) increases with increasing viscosity. It is ported to the positive side of a piston actuator (29) which is attached to the fluid throttling valve (32). Increasing viscosity causes the throttling valve to open. This causes the regulated supply pressure (33) to the rate sensor (10) to increase. Regulated pressure (33) is ported back to the negative side of the piston actuator, causing the throttling valve (32) to close until regulated supply pressure is nearly equal to viscosity sensor output pressure. For the viscosity sensor in FIGS. 3 and 4, $\Delta P_{capillary} = K \mu = \Delta P_{regulated \, supply}$, the desired schedule of regulated supply pressure (33) to the rate sensor nozzle (13).

FIG. 7 is a schematic view of hardware which may form the components of the block diagram of FIG. 6. In this arrangement, the viscosity sensor output (37) drives the pilot pressure regulator (31). Supply fluid (39) is ported to the viscosity sensor differential pressure regulator (28) and the pilot pressure regulator throttling valve (32). Supply flow passes through the differential pressure regulator throttling valve (42) and through the sharp-edged orifice (27), creating an orifice upstream pressure (44) greater than the orifice downstream pressure (45). Orifice upstream pressure (44) is fed to the closing side or compartment (47) of an actuator piston (46) connected to the throttling valve (42). Orifice downstream pressure is fed to the opening side or compartment (48) of the actuator piston (46). The throttling valve (42) remains open until the force created by orifice upstream pressure (44) minus the downstream pressure (45) acting on the sensing piston (46) is nearly equal to the force created by the flow setting reference spring (49). At this point, further increases in flow through the orifice (27) create an increase in pressure difference (44-45) which causes the throttling valve (42) to modulate closed, to regulate the pressure across the orifice (27) to a fixed value. This results in a constant flow through the orifice (27) and capillary (23). As fluid viscosity increases, capillary flow remains constant, but capillary upstream pressure (45) will increase proportional to fluid viscosity. Capillary upstream pressure (45) is ported to the pilot pressure regulator (31) and specifically to the opening side or compartment of a second sensing piston (29), opening the throttling valve (32). Fluid supply (39) passes through the throttling valve (32), creating a supply pressure (33) to the rate sensor nozzle (13). Rate sensor supply pressure (33) is ported back to the closing side or compartment (55) of the piston (29). When supply pressure (33) starts to exceed viscosity sensor output pressure (45), the force created across the sensing piston (29) acts against a proportioning spring (54) to close the throttling valve (32) until rate sensor supply (33) nearly equals viscosity sensor output pressure (45). The capillary (23) and rate sensor (10) are both vented to a common fluid return (36). The result is a regulated supply pressure (33) which is proportional to fluid viscosity. With the proper reference spring setting (49), orifice area (27) and capillary sizing (23), the embodiment will nearly exactly produce the required flow schedule (21) in FIG. 3.

FIGS. 8, 9, and 10 present a preferred embodiment which provides the required flow schedule with only one regulator assembly or throttling valve (61). FIG. 8 is a block diagram of the preferred embodiment. It utilizes the viscosity sensor (30) to scale the regulated supply/feedback pressure (33) to the feedback or negative side of the pressure regulating valve piston (58). The scaled feedback pressure (59) is compared to a reference spring force (60). The difference of the two pressures creates a force to modulate the single throttling valve (61) and provide the required flow and pressure to the rate sensor (10). The equation for a pressure regulator is $$\frac{P_{regulated\ supply}}{P_{constant\ reference}} = \frac{G}{1 + GH}$$

where H=the algorithm for the viscosity sensor (30) used in a feedback network and G=(summing piston area)×(output pressure versus stroke of the throttling valve)/reference spring rate. For an accurate supply pressure regulator, the loop gain GH is much larger than one.

Thus $$\text{Thus } \frac{G}{1 + GH} \approx \frac{G}{GH} \text{ or } \frac{1}{H}$$

$$P_{regulated\ supply} = \frac{1}{H} \times (P_{constant\ reference})$$

Since the rate sensor needs a $P_{regulated\ supply} = K\mu P_{reference}$ $$K\mu = \frac{1}{H} \text{ or}$$

$$H = \frac{1}{K\mu}, \text{ the}$$

characteristic required for the feedback network to provide the required algorithm.

FIG. 9 schematically represents the block diagram of FIG. 8 and the implementation of the algorithm $$H = \frac{1}{K\mu} \text{ or } \frac{P_{regulated\ supply}}{P_{reference}} = \frac{G}{1 + GH} = \frac{1}{H} = K\mu$$

The feedback network consists of a capillary (23) and a sharp-edged orifice (27) where $R_c$ is the equivalent resistant of the capillary and $R_o$ is the equivalent resistance of the capillary.

$$H = \frac{P_{feedback}}{P_{regulated\ supply}} = \frac{R_o}{R_o + R_c}$$

To approximate the required curve or supply pressure algorithm, $R_c >> R_o$.

This gives $$H \approx \frac{R_o}{R_c}$$

$R_o = f(\Delta P_o, A_o)$ for $R_e > 100$. With $\Delta P_o$ constant, $R_o$ is also constant and will not be a function of viscosity.

For a capillary, $$R_C = \frac{K_C \mu L}{D^4}$$

and varies directly proportional to fluid viscosity

Therefore $$H \approx \frac{R_O}{R_C} = \frac{R_O D^4}{K_C \mu L} = \frac{1}{K\mu},$$

implementing the desired algorithm. Since $R_C >> R_O$, the feedback pressure (59) will be small compared to the regulated supply pressure (33). This requires a low pressure regulator setting determined by the preload in a reference spring (67) divided by the area of a diaphragm (68). It also requires an extremely accurate, low-friction modulating valve assembly. The reference spring (67) provides a modulating valve opening torque through a beam (69) and a low friction pivot and seal (70) to hold a ball valve (71) open against its closing spring (72). Supply fluid (39) passes through the valve (71) to the rate sensor (10) supply port and to the capillary (23) of the viscosity sensitive feedback network. The feedback pressure (59) is proportional to the regulated supply pressure (33) and is inversely proportional to fluid viscosity through the capillary. Feedback pressure (59) acts upon the closing side of the piston diaphragm (68) and beam (69) to provide a valve closing torque. When feedback closing torque nearly equals opening torque created by the reference spring (67), the ball valve (71) modulates toward the closed position, to limit regulated supply pressure (33) to the desired value. As fluid viscosity increases, feedback pressure (59) decreases, allowing the valve (71) to open, increasing supply pressure (33) to the rate sensor (10).

FIG. 10 is a cross-sectional drawing of the preferred structural embodiment which is shown schematically in FIG. 9 and which accurately produces the supply fluid regulation needed to provide constant rate sensor gain as fluid viscosity changes. Typical performance is shown on the dashed line (22) of FIG. 3. The embodiment of FIG. 10 includes a lower housing (75) to which is screwed the rate sensor (10). The rate sensor consists of a top laminate or plate (76) which allows the rate sensor supply fluid to exhaust to the fluid return pressure (36) and constrains the laminar jet from deflecting upwards, creating unwanted output signals. The central plate (78) of the rate sensor (10) contains the supply nozzle, exhaust cavities on both sides of the jet, and the differential receiver ports. The bottom plate (79) of the rate sensor (10) constrains the jet from bending down and provides ports and sealing surfaces which connect the rate sensor supply nozzle and output ports to the appropriate pair of output ports (80) and fluid return port (81) in the housing (75).

A top housing (82) contains the viscosity sensitive feedback network, sensing piston, and supply fluid throttling valve. The top housing is bolted to the bottom housing (75) with screws and is appropriately sealed by O-rings to prevent unwanted fluid leakage. Supply fluid is ported to the top housing (82) through a modulating valve assembly housing (83), which contains a fluid supply port (84). A valve seat (85) is screwed into the housing (83) and is appropriately sealed. A ball (71) is guided by the seat (85) and utilized to modulate the supply fluid. A return spring (72) keeps the ball loaded against the drive pin (88) in the beam assembly (69). The beam (69) is attached to the upper housing (82) by a yoke which is pivoted at (70) on low-friction ball bearings attached to the housing (82). An O-ring seal (91) prevents regulated supply pressure (33) from leaking past the beam (69) to the fluid return cavity (36).

The sensing piston assembly consists of a low friction diaphragm seal (92) bonded to a retainer plate (93) and held to the housing by a retaining ring (94) and screws. The retainer plate (93) is screwed directly to the beam assembly (69). The retainer plate (93) also provides a guide for the reference spring (67).

The viscosity sensitive feedback network is also contained in housing (82). The capillary (23) consists of a coil (96) of thin-walled tubing with a straight inlet section (97) which protrudes into and communicates with the regulated pressure cavity (98). The end portion of the capillary is retained and sealed as indicated at (99). The coil (96) is held to the housing by a flat plate (100) and retaining screw. The coil is of sufficient length to provide laminar (viscous) flow at all operating conditions. The flow in the feedback cavity (59) is ported to the fluid return cavity (36) through a viscosity-insensitive sharp-edged orifice (27) formed through the diaphragm (92) and machined through diaphragm retainer plate (93).

I claim:

1. A constant gain angular rate sensing system comprising a laminar jet angular rate sensor having a supply nozzle for receiving pressurized hydraulic supply fluid and for producing a laminar jet of hydraulic fluid and further having means responsive to said jet for producing output pressure signals which vary as a function of deflection of said jet due to the angular velocity of the rate sensor, means for sensing the viscosity of said supply fluid, and means responsive to said sensing means for controlling the pressure of said supply fluid to said supply nozzle and for causing said pressure to change in direct proportion to and as a substantially linear function of changes in the viscosity of said supply fluid.

2. An angular rate sensing system as defined in claim 1 in which said means for sensing the viscosity of said supply fluid comprise a capillary fluid restrictor and further comprise a flow control device for maintaining a constant volumetric flow rate through the restrictor.

3. An angular rate sensing system as defined in claim 2 in which the downstream side of said rate sensor and the downstream side of said capillary restrictor communicate with a common fluid return, the upstream side of said capillary being supplied with fluid from said flow control device, and the upstream side of said rate sensor being maintained at a pressure proportional to the pressure at the upstream side of said capillary restrictor.

4. An angular rate sensing system as defined in claim 3 in which said flow control device comprises a sharp-edged orifice and further comprises a differential pressure regulator for maintaining the pressure drop across the orifice at a substantially constant value.

5. An angular rate sensing system as defined in claim 4 in which said differential pressure regulator comprises an inlet communicating with a source of pressurized fluid and further comprises an outlet communicating with the upstream side of said orifice, said regulator including a chamber having a piston movable therein and dividing the chamber into first and second compartments, said first and second compartments communicating with the upstream and downstream sides, respectively, of said orifice, and a throttling valve movable in response to movement of said piston and operable to regulate the flow of pressurized fluid from said inlet to said outlet.

6. An angular rate sensor as defined in claim 5 further including a pilot pressure regulator which responds to pressure upstream of the capillary restrictor to provide supply fluid to the rate sensor at a pressure proportional to the pressure at the upstream side of the capillary restrictor.

7. An angular rate sensing system as defined in claim 6 in which said pilot pressure regulator comprises an inlet communicating with said source of pressurized fluid, said pilot pressure regulator having an outlet communicating with said rate sensor and delivering said pressurized supply fluid to said rate sensor, said pilot pressure regulator including a chamber having a piston movable therein and dividing such chamber into first and second compartments, the first and second compartments of said pilot pressure regulator communicating with the upstream side of said capillary and with the outlet of said pilot pressure regulator, respectively, and a throttling valve movable in response to movement of the piston of said pilot pressure regulator and operable to regulate the flow of pressurized fluid from the inlet to the outlet of the pilot pressure regulator.

8. An angular rate sensing system as defined in claim 1 in which said means for sensing viscosity of said supply fluid comprise a capillary fluid restrictor and further comprises a flow control device for both maintaining a constant flow rate through the restrictor and for providing pressurized supply fluid to the rate sensor.

9. An angular rate sensing system as defined in claim 8 in which said flow control device comprises a sharp-edged orifice and further comprises a differential pressure regulator for maintaining the pressure drop across the orifice at a substantially constant value and for providing pressurized supply fluid to the rate sensor.

10. An angular rate sensing system as defined in claim 9 in which the upstream side of said capillary restrictor communicates with the upstream side of said rate sensor, the downstream side of said rate sensor communicating directly with a fluid return, and the downstream side of said capillary communicating with said fluid return through said sharp-edged orifice.

11. An angular rate sensing system as defined in claim 10 in which said differential pressure regulator comprises a throttling valve having an inlet communicating with a source of pressurized fluid and having an outlet communicating with the upstream side of said rate sensor and with the upstream side of said capillary, said regulator including a chamber having a piston movable therein and dividing the chamber into first and second compartments, said compartments communicating with upstream and downstream sides, respectively, of said orifice, and said throttling valve being movable in response to movement of said piston and operable to regulate the flow of pressurized fluid from said inlet to said outlet.

12. An angular rate sensing system as defined in claim 11 further including a beam attaching said piston to said valve member, and means supporting said beam to pivot about an axis located between the ends of said beam, such that movement of said piston causes movement of said throttling valve.

13. An angular rate sensing system as defined in claim 12 in which said regulator further comprises a spring located in said second compartment and urging said piston in such a direction as to cause said beam to move said valve member in an opening direction, said spring providing a force against said piston proportional to the desired flow through said capillary.

* * * * *